United States Patent
Youn

(10) Patent No.: US 6,882,841 B1
(45) Date of Patent: Apr. 19, 2005

(54) METHOD FOR PERFORMING AN ENHANCED RANDOM ACCESS USING INFORMATION OF FORWARD COMMON CHANNELS IN A MOBILE COMMUNICATION SYSTEM

(75) Inventor: Young Sik Youn, Seoul (KR)

(73) Assignee: LG Information and Communications, Ltd., Seoul (KR)

( * ) Notice: Subject to any disclaimer, the term of this patent is extended or adjusted under 35 U.S.C. 154(b) by 0 days.

(21) Appl. No.: 09/348,634

(22) Filed: Jul. 6, 1999

(30) Foreign Application Priority Data

Aug. 4, 1998 (KR) ........................................ 1998-31784

(51) Int. Cl.⁷ ................................................ H04Q 7/20
(52) U.S. Cl. .................... 455/434; 455/515; 370/329; 370/336
(58) Field of Search ................................. 455/434, 515, 455/32.1, 435; 370/329, 336, 311, 337, 465, 470, 230

(56) References Cited

U.S. PATENT DOCUMENTS

| | | | | |
|---|---|---|---|---|
| 5,166,929 A | * | 11/1992 | Lo | 370/448 |
| 5,357,513 A | * | 10/1994 | Kay et al. | 370/332 |
| 5,604,730 A | * | 2/1997 | Tiedemann, Jr. | 370/252 |
| 5,673,259 A | * | 9/1997 | Quick, Jr. | 370/342 |
| 5,802,465 A | * | 9/1998 | Hamalainen et al. | 455/403 |
| 5,991,633 A | * | 11/1999 | Corriveau et al. | 455/466 |
| 6,094,576 A | * | 7/2000 | Hakkinen et al. | 455/422 |
| 6,167,056 A | * | 12/2000 | Miller et al. | 370/441 |
| 6,178,164 B1 | * | 1/2001 | Wang et al. | 370/331 |
| 6,195,534 B1 | * | 2/2001 | Sakoda et al. | 455/45 |
| 6,339,713 B1 | * | 1/2002 | Hansson et al. | 455/574 |

* cited by examiner

Primary Examiner—Tilahun Gesesse
(74) Attorney, Agent, or Firm—Fleshner & Kim, LLP

(57) ABSTRACT

Method for performing a random access in a mobile communication system, including the steps of monitoring at base station a state of a reverse common channel, determining state information of the reverse common channel corresponding to a result of the monitoring using one slot allocated to a forward common channel, and transmitting the state information to respective mobile stations through the forward common channel, whereby improving a message transmission efficiency because one random access slot allocated to the forward common channel is used, not entirely, but partly, or the state information of the reverse common channel is transmitted repeatedly for a given times in a case when the base station transmits state information of the reverse common channel to all mobile stations within cells of sectors of its own.

23 Claims, 5 Drawing Sheets

METHOD FOR PERFORMING AN ENHANCED RANDOM ACCESS USING INFORMATION OF FORWARD COMMON CHANNELS IN A MOBILE COMMUNICATION SYSTEM

BACKGROUND OF THE INVENTION

1. Field of the Invention

The present invention relates to a method for performing a random access in a mobile communication system, and more particularly, to an improved method for performing a random access in a mobile communication system.

2. Background of the Related Art

In general, a CDMA mobile communication system is provided with a plurality of base stations BS each for providing radio communication paths with a plurality of mobile station, a plurality of base station controller BSC each for controlling operation of the base stations, a plurality of mobile switching center MSC each for switching call signals from mobile stations, and a home location registration/visitor location registration HLR/VLR for administrating mobility of mobile stations. A general origination call processing procedure, which comes from each mobile stations in a mobile communication system, will be explained with reference to FIG. 1.

Referring to FIG. 1, upon a mobile station is provided with the power, the base station transmits information for a pilot channel, a synchronizing channel, and a broadcasting (call) channel to the mobile station by turns(a1, b1 and c1). When the mobile station issues the origination call, the mobile station requests the base station for a call connection through the access channel(d1). In this instance, the base station allocates a channel according to request of the mobile station within its own cell or sector, for allowing the call connection if the present reverse channel communication capacity is below a preset threshold value, and if the present reverse channel communication capacity exceeds a preset threshold value, the base station allocates no channel for not allowing the call connection(e1). As shown in FIG. 1, procedure thereafter is a generally known procedure of transmission of a preamble between the base station and the mobile station(g1), and transmission of data between the base station and the mobile station(h1). A random access method called as a slotted ALOHA has been used in the IS-95B cellular CDMA mobile communication system. In the Slotted ALOHA random access method, a plurality of slots each having a predetermined slot period (i.e., 200 ms) are allocated over a reverse common channel, and the mobile station which will transmit the origination call starts to transmit a message at a starting point of the slot for performing random access.

FIG. 2 illustrates a timing diagram for explaining a random access method(Slotted ALOHA) in the IS-95B cellular CDMA mobile communication system, where 'x' denotes a time point at which a message to be transmitted is generated, and an arrow '1' denotes a time point an actual transmission is performed irrespective of a channel situation. A slot interval is defined to be longer than a maximum length of a message. However, all access channel message are transmitted during one slot. In such as random access method, a size of an access channel slot is denoted as 4+PAM_SZ+MAX_CAP_SZ, and values of the PAM_SZ and the MAX_CAP_SZ are determined by a message broadcasted from the base station. In data transmission, the mobile station always transmits an 1+PAM_SZ preamble, which has a fixed size, before transmission of a 3+MAX_CAP_SZ message. For example, if one frame is a 20 msec, the PAM_SZ value is 2, and, when the MAX_CAP_SZ has a value 1, an size of an entire access channel slots may be 140 msec. In the aforementioned related art random access method, the base station can receive data transmitted from one mobile station through a slot. If two mobile stations compete for the same slot over a reverse common channel, the base station receives only one signal of the two. If more than two mobile stations compete for the same slot over the reverse common channel, the base station may receive one of the signals. In the random access method shown in FIG. 2, if a transmission message is generated at a position X1 forward of a slot starting time point, the transmission message can be transmitted at a starting point of the slot without waiting time. However, if the transmission message is generated at a position 'X2' passed through the starting point of the slot, transmission of the message may be waited until the starting point 'X3' of the next slot. If another transmission message is generated during waiting for the starting point 'X3' of the next slot, there will be a contention problem in which the two kind of messages collide to each other. Such an access method is applicable to the IS-95B cellular CDMA mobile communication system which has not so many mobile stations and a simple system without any significant problem.

However, the aforementioned related art random access method may not be applied to a mobile communication system developed after the IS-95C which is based on multimedia information such as audio, video, image, text and the like, because it is expected that mobile communication system developed after the IS-95C has much more subscribers registered therein compared to the mobile communication system based on the IS-95B. Data will be multimedia information such as audio, video, image and text having a variable length depending on data characteristics. Therefore, if the random access is performed in this environment according to the related art random access, collision of the transmission messages is vulnerable.

And, when the mobile station is performing random access using the fixed sizes 3+MAX_CAP_SZ of slots, the transmission efficiency may be lower. That is, because even one message which has a message amount smaller than one slot size(for example, 80 msec or 40 msec) occupies one slot completely, an unused portion of the slot is wasted. Those disadvantages provides a cause to a lower a transmission efficiency and, thereby deteriorating quality of service in communication when many mobile stations perform random access during a almost similar time.

SUMMARY OF THE INVENTION

Accordingly, the present invention is directed to an improved method for performing a random access in a mobile communication system that substantially obviates one or more of the problems due to limitations and disadvantages of the related art.

An object of the present invention is to provide an improved method for performing a random access in a mobile communication system which can improve a message transmission efficiency and minimize random access failures.

Other object of the present invention is to provide a random access slot architecture which can improve a transmission efficiency or minimize a ratio of failure when a base station transmits information on a reverse common channel state to respective mobile stations.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for performing a random access in a mobile communication system, includes the steps of monitoring at base station a state of a reverse common channel, determining state information of the reverse common channel corresponding to a result of the monitoring using one slot allocated to a forward common channel, and transmitting the state information to respective mobile stations through the forward common channel.

The method for performing a random access in a mobile communication system of the present invention can improve a message transmission efficiency because one random access slot allocated to the forward common channel is used, not entirely, but partly(for a quarter), or the state information of the reverse common channel is transmitted repeatedly for a given times in a case when the base station transmits state information of the reverse common channel to all mobile stations within cells of sectors of its own. And, because the mobile station performs a random access using a slot allocated to the reverse common channel according to state information of the reverse common channel transmitted from the base station, i.e., the random access is performed according to the state information of the reverse common channel broadcasted from the base station, a possibility of data collision is reduced compared to the related art. Accordingly, if the method for performing a random access in a mobile communication system is applied to a mobile communication system after the IS-95C which is based on multimedia information, more improved random access method can be provide, providing an improved communication quality.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be performed in detail to the preferred embodiments of the present invention, examples of which are illustrated in the accompanying drawings.

In order to implement a random access method of the present invention, the following new functions should be defined between respective mobile station and respective base station.

First, the base station should monitor a reverse common channel state periodically and provides state information of reverse common channel to respective mobile stations through a forward common channel, periodically.

Figure 1:
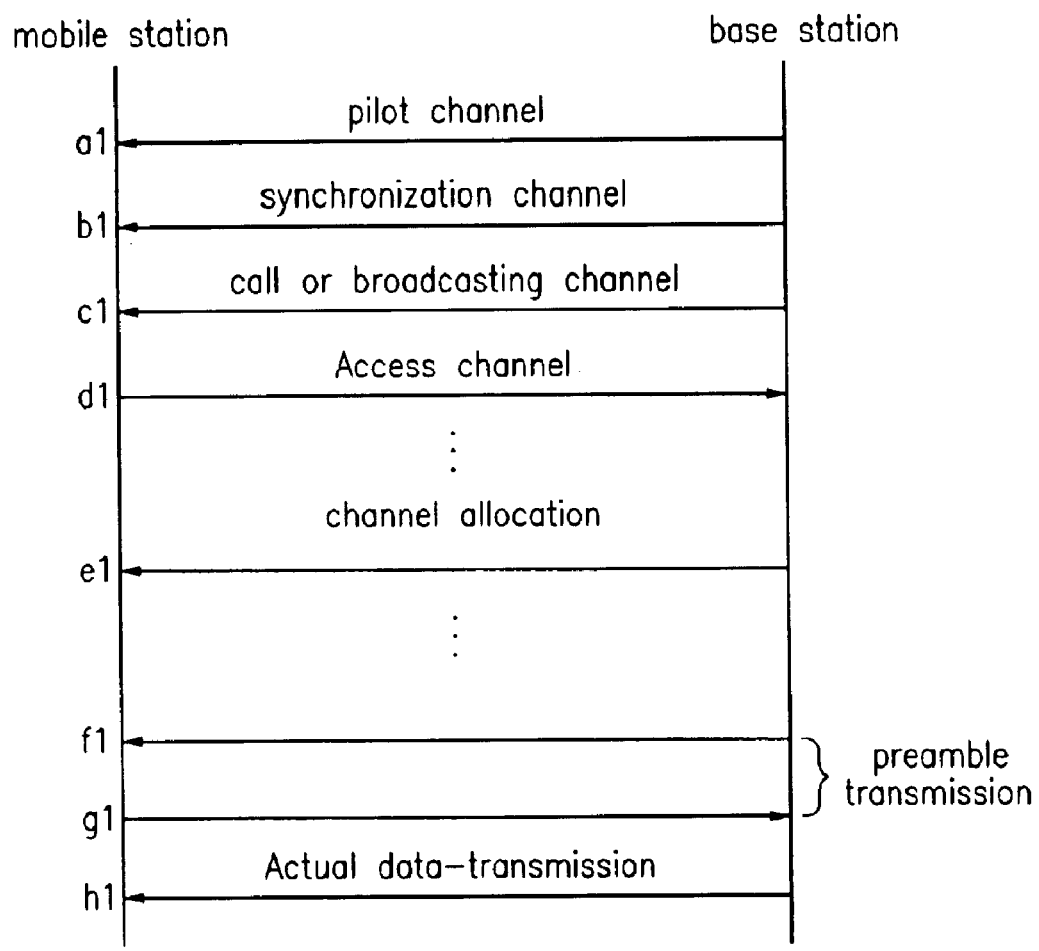
FIG. 1 illustrates a call connection procedure in IS-95A or IS-95B cellular CDMA mobile communication system.
Figure 2:
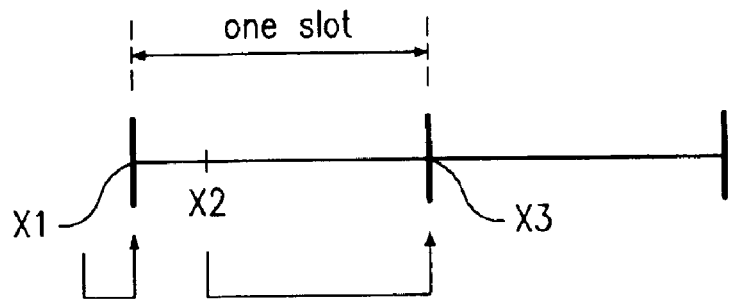
FIG. 2 illustrates a timing diagram for explaining a random access method(Slotted ALOHA) in the IS-95B cellular CDMA mobile communication system.
Figure 3:
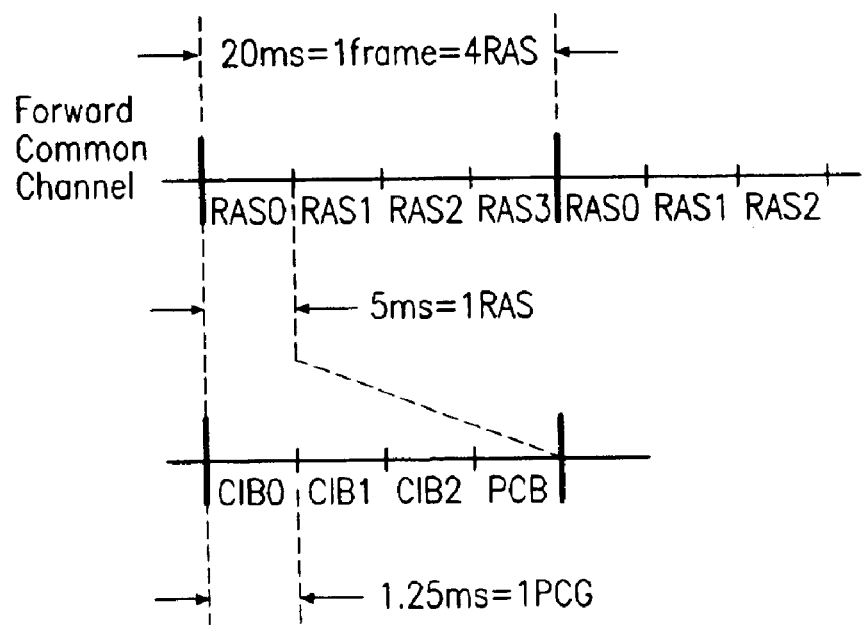
FIG. 3 illustrates a formation of a random access slot allocated to a forward common channel in accordance with a preferred embodiment of the present invention.

Referring to FIG. 3, in a method for performing a random access in a mobile communication system in accordance with a preferred embodiment of the present invention, it is assumed that one frame period of a forward common channel is 20 ms, and each frame includes four RAS(random access slot) RAS0~RAS3 allocated thereto. And, each of the random access slots RAS0~RAS3 has a period of 5 ms, consisting of three channel information bits each with a size of 1.25 ms CIB0~CIB2 and one power/reserve control bit PCB. Transmission of the channel information bits CIB0~CIB2 and the power/reserve control bit PCB may be varied with situation and intention. For example, if only one message which requires a random access is generated in a right prior slot, transmission bits are formed as shown in FIG. 3 for improving a reliability of the random access. Conversely, if at least two messages each of which requires a random access are generated in a right prior slot, the entire transmission bits may be formed of channel information bits. The base station may set the value of channel information bits CIB0~CIB2 and the power/reserve control bit PCB allocated to one frame to A0"-idle status: I, or A1"-busy status B, respectively.

Though each of the channel information bits CIB0~CIB2 may be represented with only one bit, in one embodiment of the present invention, each of the channel information bits CIB0~CIB2 has a (3,1) block code type which transmits three channel information bits repeatedly, taking a high probability of bit error occurrence in a radio environment and a consequential random access performance deterioration into consideration. TABLE 1 below illustrates an embodiment in which the channel information bits CIB0~CIB2 and the power/reserve control bit PCB of each slot transmitted from a base station to a forward common channel are set to "0"-idle status: I, or "1"-busy status: B.

TABLE 1

| Transmission bits | denotes |
| --- | --- |
| 0000 | Idle - Normal : IN |
| 0000 | Idle - Reservation : IR |
| 1110 | Busy - Down : BD |
| 1111 | Busy - Up : BU |

In table 1, the idle state with '0' value denotes a state in which a power intensity of each signal received from the base station through the reverse common channel does not exceeds a threshold value, or a state in which the signal is not decodable because synchronization is not matched. While the busy state with '1' value denotes a state in which total power of signals received at the base station through the reverse common channel exceeds a threshold value, i.e., a state in which there is no empty channel, presently. Referring to table 1, transmission bits transmitted from the base station to respective mobile stations are any one of Idle-Normal: IN, Idle-Reservation: IR, Busy-Down:BD, and Busy-Up: BU. The Idle-Normal: IN denotes a state in which the reverse common channel is idle and reserved by no mobile station, allowing all mobile station to perform random access thereto. The Idle-Reservation: IR denotes the reverse common channel is idle and reserved by a specific mobile station, allowing only the specific mobile station for the random access. The Busy-Down: BD denotes the reverse common channel is busy and a command to the mobile station to decrease a transmission power, and the Busy-Up: BU denotes the reverse common channel is busy and a command to the mobile station to increase the transmission power.

Figure 5:
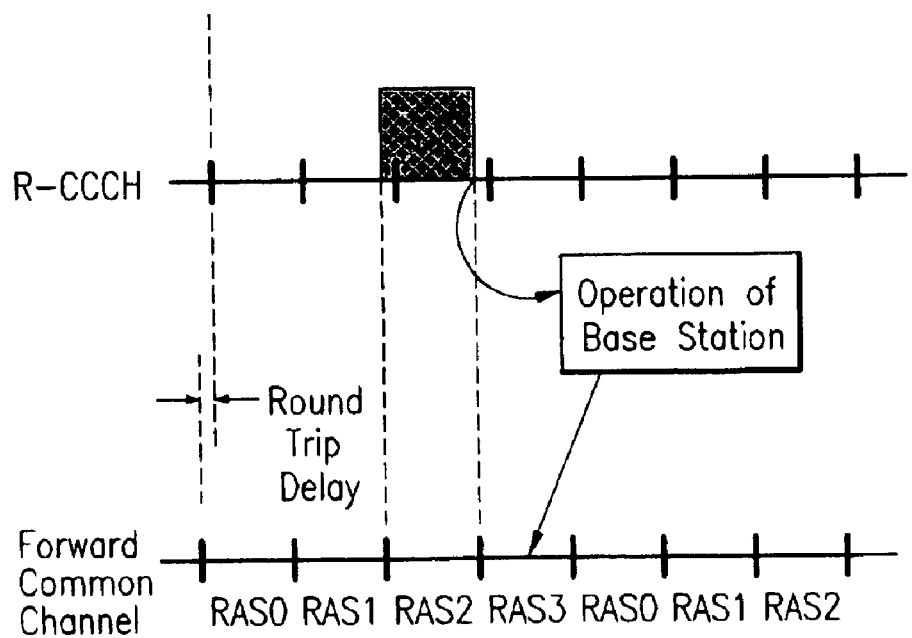
FIG. 5 shows an occurrence of round trip delay allocated to a forward common channel and a reverse common channel.

Second, as shown in FIG. 3, the base station should determine the power control command before the starting points of state information on the reverse common channel and each of the random access slot RAS0~RAS3 allocated to the reverse common channel. In the method for performing a random access in a mobile communication system, sizes of slots allocated to the forward common channel is the same with the reverse common channel. In this instance, as shown in FIG. 5, the slots respectively allocated from the base station to the forward common channel and the reverse common channel are involved in a time delay as much as a round trip delay, since frames used in the forward common channel and the reverse common channel are not synchronized each other. Accordingly, in the method for performing a random access in a mobile communication system of the present invention, the base station synchronizes the slots received from respective mobile stations to the slots of the forward common channel before use.

Figure 4:
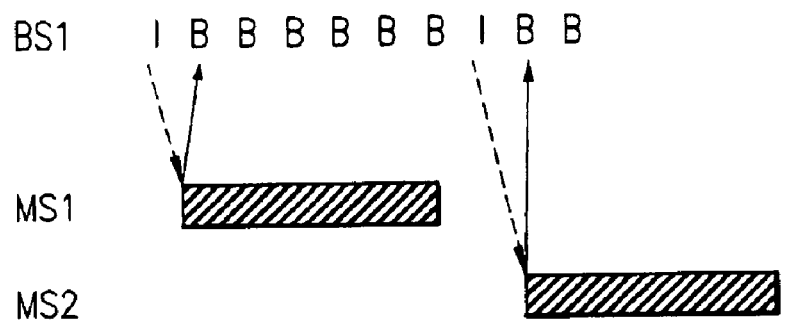
FIG. 4 shows an operation for transmission reverse common channel state information from a base station to respective mobile stations in accordance with a preferred embodiment of the present invention.

Third, the state information over the reverse common channel transmitted from the base station to respective mobile stations should be fed back continuously using a portion of broadcasting channel. That is, as shown in FIG. 4, if the state information on the reverse common channel transmitted from the base station BS1 to respective mobile stations in its own cell or sector is the idle status bit I, the mobile station MS1 can perform a random access through a random access slot allocated to the reverse common channel. In FIG. 4, it is shown that the reverse channel is kept busy while the mobile station MS1 transmits data. In such a case, other mobile stations perform no random access until there is a random access slot in a idle state. However, if the call from the mobile station MS1 is released, for the base station to transmit state information on the reverse common channel containing the idle status bit 'I', another mobile station MS2 can perform a random access through a random access slot allocated to the reverse common channel.

Functions of the mobile station to be defined newly are as follows.

Figure 6:
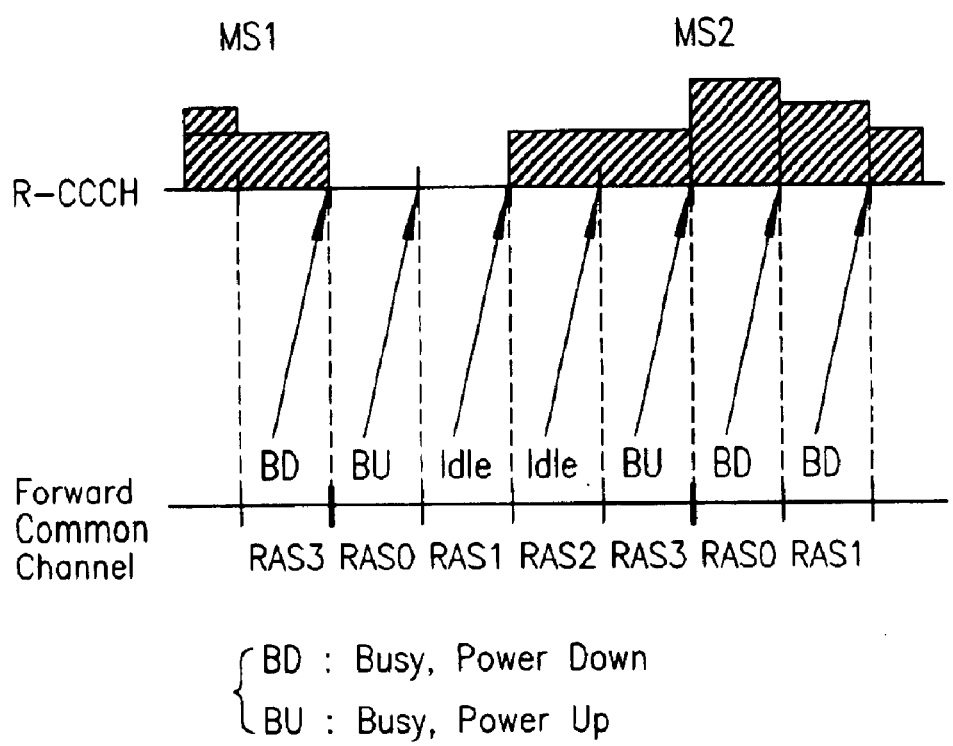
FIG. 6 illustrates states of a forward common channel and a reverse common channel in accordance with a preferred embodiment of the present invention; and, FIG. 7 illustrates a flow chart for explaining an operation of a mobile station in accordance with a preferred embodiment of the present invention.

First, as shown in FIG. 6, each mobile station should monitor a random access slot allocated to the forward common channel, periodically. That is, each mobile station should monitor both channel information bits CIB0~CIB2 contained in each random access slot allocated to the forward common channel and control bits PCB contained as necessary before performing a random access at a starting point of every random access slot RAS0~RAS3. When the mobile station performs random access, the mobile station provides a message for performing the random access from a starting point of an odd numbered random access slot RAS1 or RAS3 if the reverse common channel represented by channel information bits in a prior random access slot RAS0 is in a idle state. In this instance, bits received from the base station includes three channel information bits CIB0~CIB2 and one power/reservation control bit PCB as shown in TABLE 2, below.

TABLE 2

| Received bits | Denotes |
| --- | --- |
| 0000, 0010, 0100, 1000 | Idle - Normal : IN |
| 0001, 0011, 0101, 1001 | Idle - Reservation : IR |
| 1110, 1100, 1010, 0110 | Busy - Down : BD |
| 1111, 1101, 1011, 0111 | Busy - Up : BU |

As shown in TABLE 2, the bits each mobile station is received from the base station will be any one of Idle-Normal: IN, Idle-Reservation IR, Busy-Down: BD, and Busy-Up: BU. There are four kinds of received bits in each row in TABLE 2 for showing cases when bit transmission errors are occurred in a process that the bits are transmitted from the base station to the mobile station. Although the three channel information bits used in the present invention, at lease one channel information bits are considered to be bits having actual data transmitted from the base station. The received bit used herein has the same meaning explained in the case of the transmission bit.

Second, if two random access slots in idle states are detected in succession after the mobile station transmits the message as a result of monitoring the next random access slots, the transmission should be stopped as it is considered that the random access is failed.

Figure 7:
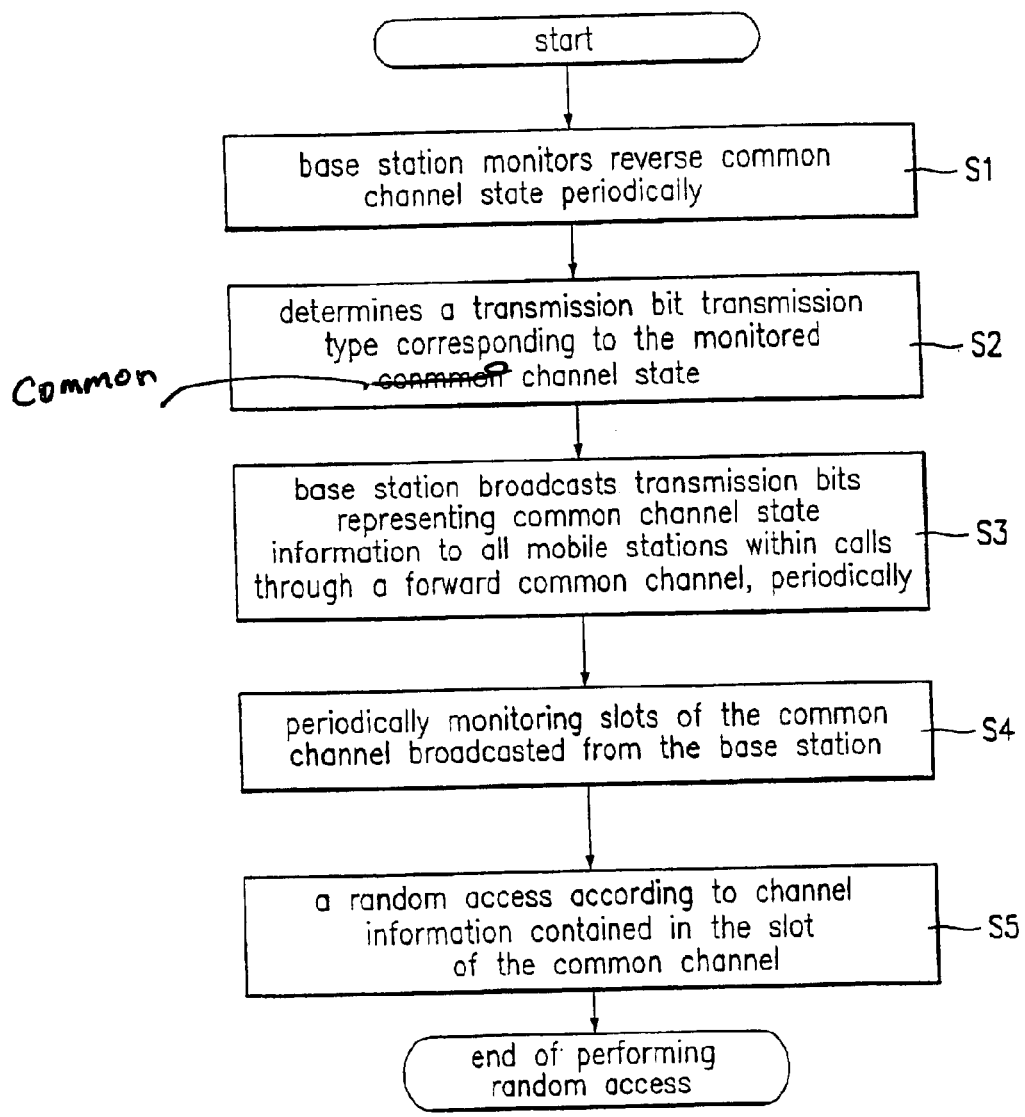

FIG. 7 illustrates a flow chart for explaining an operation of a mobile station in accordance with a preferred embodiment of the present invention, referring to which a method for performing a random access in a mobile communication system will be explained.

The base station monitors a state of the reverse common channel, periodically(S1). Then, the base station determines a transmission type of transmission bit corresponding to the state of the reverse common channel for every random access slot allocated to the forward common channel(S2). That is, as shown in TABLE 1, it is determined whether the transmission bit transmission type is a (3,1) block code type which includes 3 channel information bits and one control bit which uses a random access slot, or another transmission type. Then, the base station transmits the prepared transmission bits to all mobile stations within cells or sectors of its own using the forward common channel(S3). In this instance, when the transmission bit transmission type is the (3, 1) block code type, the transmission bits for informing the reverse common channel state will be one of IN, IR, BD and BU shown in TABLE 1. In the present invention, it is desired that if the transmission bits from the base station to the mobile station are IRs, the base station transmits the IRs in succession loaded on two slots for preventing occurrence of transmission error. The mobile station monitors the transmission bits(received bits in view of the mobile station) broadcasted from the base station, periodically(S4). Then, the mobile station performs a random access according to the state information of the reverse common channel contained in the received bits(S5). In this instance, if a first random access slot is defined as RAS0, the mobile station transmits a message for performing a random access in the base station when the odd numbered random access slots RAS1 and RAS3 are at IN. In contrast, the mobile station having confirmation of reservation from the base station transmits the message for performing a random access only in a case when the present reverse common channel state is IR. While each mobile station transmits the data and receives the state through the forward common channel, it is possible that a mobile station start transmission within a RAS, and then another mobile station may try transmission within another RAS since a time delay of 2 RAS for respective mobile stations in transmission is occurred.

In the meantime, a mobile station which is performing random access adjusts transmission power according to a value of a power control bit PCB transmitted through the forward common channel. That is, the mobile station increases the transmission power if the received bit is BU, and decreases the transmission power if the received bit is BD.

If two random access slots RASs in idle states occur in succession during performing random access, the transmission of message is stopped, taking a possibility of state bit transmission error occurrence for the two random access slots RASs or the random access slot RAS in an idle state occurred for the first time after the mobile station starts to perform the random access into account. The transmission power is not changed for the random access slot RAS in an idle state occurred when the mobile station is performing random access.

The mobile station, having the random access finished, determines a reverse common channel state of the next random access slot for verifying a proper random access. If the reverse common channel state of the random access slot RAS is busy after finish of the random access, it is determined that the random access is performed properly, and if the reverse common channel state of the random access slot RAS is idle, it is determined that the random access is failed, and the random access is performed, again.

As has been explained, the method for performing a random access in a mobile communication system of the present invention can improve a message transmission efficiency because one random access slot allocated to the forward common channel is used, not entirely, but partly, or the state information of the reverse common channel is transmitted repeatedly for a given times in a case when the base station transmits state information of the reverse common channel to all mobile stations within cells of sectors of its own. And, because the mobile station performs a random access using a slot allocated to the reverse common channel according to state information of the reverse common channel transmitted from the base station, i.e., the random access is performed according to the state information of the reverse common channel broadcasted from the base station, a possibility of data collision is reduced compared to the related art. Accordingly, if the method for performing a random access in a mobile communication system is applied to a mobile communication system after the IS-95C which is based on multimedia information, more improved random access method can be provide, providing an improved communication quality.

It will be apparent to those skilled in the art that various modifications and variations can be performed in the method for performing a random access in a mobile communication system of the present invention without departing from the spirit or scope of the invention. Thus, it is intended that the present invention cover the modifications and variations of this invention provided they come within the scope of the appended claims and their equivalents.

What is claimed is:

1. A communication method comprising:
   monitoring at a base station a state of a reverse common channel;
   determining state information of the reverse common channel corresponding to a result of the monitoring;
   broadcasting the state information combined with power control information based on the state information in a same slot to a mobile station through a forward common channel using each slot allocated to the forward common channel; and
   performing a random access of slots to transmit data to the base station on the reverse common channel based on the state information combined with the power control information.

2. A method as claimed in claim 1, wherein the slot includes at least two channel information bits and one power or reservation control bit.

3. A method as claimed in claim 2, wherein, if at least two of the channel information bits are used the channel information bits are repeated with an odd number of times.

4. A method as claimed in claim 1, wherein the state information of the reverse common channel corresponding to the result of the monitoring determines one of a plurality of preset state information.

5. A method as claimed in claim 4, wherein the state information comprises:
   idle-normal state information representing a state in which the reverse common channel is in an idle state and not reserved by a particular mobile station,
   idle-reservation state information representing a state in which the reverse common channel is in a idle state and reserved by a particular mobile station,
   busy-down state information representing both a state in which the reverse common channel is in a busy state and a command for reducing a transmission power to the mobile station, and
   busy-up state information representing both a state in which the reverse common channel is in a busy state and a command for boosting a transmission power to the mobile station.

6. A method as claimed in claim 5, wherein the base station transmits a message for performing a random access in a case when every even numbered slot with reference to a first slot number of one frame has the idle-normal state information.

7. A method as claimed in claim 5, wherein the idle-reservation state information is transmitted in succession loaded on two slots in a case when the state information transmitted from the base station to the mobile station is the idle-reservation state information.

8. A method as claimed in claim 1, wherein the base station determines the power control command before a starting point of each slot allocated to the reverse common channel.

9. A method as claimed in claim 1, wherein the base station matches periods of the reverse slots the mobile station uses to forward slots before using the reverse slot.

10. A method as claimed in claim 1, wherein the base station feeds back the state information continuously using a portion of broadcasting channel.

11. A method as claimed in claim 1, wherein after the transmitting step, the method further comprises:
   receiving and analyzing at a respective mobile station state information of the reverse common channel; and,
   performing at the respective mobile station a random access according to the state information.

12. A method as claimed in claim 11, wherein the message transmission is stopped if two idle state slots are detected by the mobile station in succession as a result of monitoring the next slot after transmission of a message through an arbitrary slot for performing random access.

13. A method as claimed in claim 11, wherein the mobile station does not change the transmission power for the idle state information occurred during performing random access.

14. A method as claimed in claim 11, wherein after the step of performing a random access, the method further comprises determining a state of the reverse common channel through information contained in the next slot.

15. A method as claimed in claim 14, wherein the mobile station determines as a result of the determination that the random access is performed properly if the reverse common channel is in a busy state, and the random access is performed improperly if the reverse common channel is in an idle state.

16. A method as claimed in claim 15, wherein the mobile station automatically performs the random access again if it is determined as a result of the determination that the random access is performed improperly.

17. A communication method comprising:
 monitoring at a base station a state of a reverse common channel;
 determining state information of the reverse common channel corresponding to a result of monitoring one slot allocated to the reverse common channel;
 transmitting the state information combined with power control information in a same slot to respective mobile stations through the forward common channel; and
 randomly accessing slots to transmit data to the base station on the reverse common channel based on the state information combined with the power control information.

18. A method as claimed in claim 17, wherein the state information comprises:
 idle-normal state information representing a state in which the reverse common channel is in an idle state and not reserved by a particular mobile station,
 idle-reservation state information representing a state in which the reverse common channel is in a idle state and reserved by a particular mobile station,
 busy-down state information representing both a state in which the reverse common channel is in a busy state and a command for reducing a transmission power to the mobile station, and
 busy-up state information representing both a state in which the reverse common channel is in a busy state and a command for boosting a transmission power to the mobile station.

19. A method for performing a random access in a mobile communication system, comprising:
 monitoring at a base station a state of a reverse common channel;
 determining state information of the reverse common channel corresponding to a result of monitoring one slot allocated to the reverse common channel; and
 transmitting the state information and power control information to respective mobile stations through the forward common channel,
 wherein after the transmitting step, the method further comprises:
  receiving and analyzing at a respective mobile station state information of the reverse common channel; and
  performing at the respective mobile station a random access according to the state information, and
  wherein the message transmission is stopped if two idle state slots are detected by the mobile station in succession as a result of monitoring the next slot after transmission of a message through an arbitrary slot for performing random access.

20. A method of transmitting a frame of a forward common channel from a base station to mobile terminal controlled by the base station, comprising:
 dividing the frame into a plurality of random access slots, each slot including information to be used by mobile terminals when communicating with a base station on a reverse common channel,
 wherein the information included in each slot includes status information about whether the reverse common channel is busy or idle combined with power control information which is determined according to the status information, and
 wherein a respective mobile terminal randomly accesses slots to transmit data to the base station on the reverse common channel based on the state information combined with the power control information.

21. A method as claimed in claim 20, wherein a period of the frame is 20 ms, the plurality of random access slots is equal to four access slots, and each of the four access slots has a period of 5 ms.

22. A method as claimed in claim 21, wherein the status information is represented by 3 bits, and the power control information is represented by 1 bit.

23. A method as claimed in claim 20, wherein the status information comprises:
 idle-normal state information representing a state in which the reverse common channel is in an idle state and not reserved by a particular mobile station,
 idle-reservation state information representing a state in which the reverse common channel is in a idle state and reserved by a particular mobile station,
 busy-down state information representing both a state in which the reverse common channel is in a busy state and a command for reducing a transmission power to the mobile station, and
 busy-up state information representing both a state in which the reverse common channel is in a busy state and a command for boosting a transmission power to the mobile station.

* * * * *